(12) United States Patent
Cao

(10) Patent No.: US 12,379,594 B2
(45) Date of Patent: *Aug. 5, 2025

(54) ELECTRONIC LOUPE

(71) Applicant: CAO Group, Inc., West Jordan, UT (US)

(72) Inventor: Densen Cao, Sandy, UT (US)

(73) Assignee: CAO Group, Inc., West Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,450

(22) Filed: Sep. 1, 2023

(65) Prior Publication Data

US 2023/0408818 A1    Dec. 21, 2023

Related U.S. Application Data

(63) Continuation of application No. 18/362,919, filed on Jul. 31, 2023, which is a continuation-in-part of application No. 17/425,298, filed as application No. PCT/US2020/015089 on Jan. 24, 2020, now abandoned.

(Continued)

(51) Int. Cl.
| | |
|---|---|
| *G02B 27/01* | (2006.01) |
| *G02B 27/02* | (2006.01) |
| *G06F 1/16* | (2006.01) |
| *H04N 5/262* | (2006.01) |
| *H04N 23/56* | (2023.01) |

(52) U.S. Cl.
CPC ....... *G02B 27/017* (2013.01); *G02B 27/0172* (2013.01); *G02B 27/0176* (2013.01); *G02B 27/027* (2013.01); *G06F 1/163* (2013.01); *H04N 5/2628* (2013.01); *H04N 23/56* (2023.01); *G02B 2027/0138* (2013.01); *G02B 2027/014* (2013.01); *G02B 2027/0154* (2013.01); *G02B 2027/0178* (2013.01)

(58) Field of Classification Search
None
See application file for complete search history.

(56) References Cited

U.S. PATENT DOCUMENTS 5,920,371 A * 7/1999 Chang ................ G02B 27/0176
                                                351/158
2011/0306005 A1  12/2011 Jensen
(Continued)

FOREIGN PATENT DOCUMENTS

WO    2018/235088 A1   12/2018

*Primary Examiner* — Darryl J Collins
(74) *Attorney, Agent, or Firm* — Dobbin IP Law, P.C.; Geoffrey E. Dobbin

(57) ABSTRACT

An electronic loupe (400) features a view piece (401) mounted to a headpiece (405) by a linkage (406). A camera (402) and LED light (403) are mounted (404) in front of the view piece (401) to provide an image in the view piece (401) on displays (not shown) for the user. A control box (410) may be wired to the electronic loupe, or wirelessly connected, or the controls for the electronic loupe may reside on the view piece (401) and the headpiece (405). Other controls, such as a remote control or a foot pedal, are also disclosed. Illumination controls and location are designed for ideal illumination along various spectra. Automatic recording and documentation is also provided.

10 Claims, 8 Drawing Sheets

Related U.S. Application Data

(60) Provisional application No. 62/796,139, filed on Jan. 24, 2019.

(56) References Cited

U.S. PATENT DOCUMENTS

| | | |
|---|---|---|
| 2015/0123880 A1 | 5/2015 | Tam et al. |
| 2015/0138048 A1 | 5/2015 | Park |
| 2016/0334644 A1 | 11/2016 | Garofolo et al. |
| 2017/0181802 A1 | 6/2017 | Sachs et al. |
| 2017/0315536 A1* | 11/2017 | Brusky .................. B25J 9/1676 |
| 2018/0303574 A1 | 10/2018 | Ramirez et al. |
| 2021/0349675 A1* | 11/2021 | Noda .................... G06F 3/0304 |

* cited by examiner

ELECTRONIC LOUPE

CROSS-REFERENCES TO RELATED APPLICATIONS

This Application claims priority as a continuation of prior filed U.S. application Ser. No. 18/362,919, filed Jul. 31, 2023, which in turn claims priority as a continuation-in-part of prior filed U.S. application Ser. No. 17/425,298, filed Jul. 22, 2021, which is in turn a 371 national phase entry of prior filed PCT/US20/15089, filed Jan. 24, 2020, which claims priority to prior filed U.S. provisional application No. 62/796,139, filed Jan. 24, 2019, and incorporates the same by reference herein in their entirety.

TECHNICAL FIELD OF THE INVENTION

The present invention relates to electronic loupes for use in medical, dental, veterinary, laboratory, industrial, and any fields that need magnifications, illumination, and documentation for observed objects.

BACKGROUND ART

An optical loupe using a magnifying lens or lens system is a common device worn by human in front of their eyes to magnify the observed objects. The optical loupes already in the market are in various shapes and mechanical designs. The optical loupes have a single configuration for one eye use and a double configuration for both eyes. The optical loupes have been used in many fields including, not limited to medical, dental, veterinary, manufacturing, inspections and many others. It is always desired by user for the following features: high magnification, high resolution, light in weight, variable working distance, ease of use, recording, broadcasting, view contents in remote locations, and other desired functions.

The key challenge for an optical loupe is the higher magnification using optical lens system. Higher magnification using optical lens mean the combination of large size and multiple optical lens due to the limitation of physics. The requirement for higher magnification results in heavier weight and larger size and makes the usage of optical loupe difficult and inconvenient for better resolution. This physical limitation is why current optical loupes have a common magnification range of 2 to 5 times. For higher magnification, the optical lens will be large, and the entire system will be very heavy. In the specialty fields like medical and dental, the double configuration optical loupes also must be customized to fit human eye pupil distance and eye vision. This is also inconvenient for many customers. The optical loupe cannot record the observed event and other functions that users desire to have.

This invention is to use a video camera and a lens system as an observation outlet to view targeted objects, use mechanics, optics, electronics, and software to magnify the objects, and to use small size displays to display captured objects in front of eyes. This device can achieve all the desired features of a loupe for users: high magnification, good resolution, convenience to use, variable working distance, recording the event, storing the desired event, review stored or remotely stored records, share the event, good for user's neck and back, and many other benefits. In view of the foregoing disadvantages inherent in the known types of loupes, an improved electronic loupe that at least meets the following objectives: it is lightweight, easy to use, and provides greater magnification than currently possible with optical loupes As such, a new and improved electronic loupe may comprise multiple components, including an articulated leveter system, in order to accomplish these objectives.

DISCLOSURE OF THE INVENTION

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions as far as they do not depart from the spirit and scope of the present invention.

BRIEF DESCRIPTION OF THE DRAWINGS

In order to describe the manner in which the above-recited and other advantages and features of the invention can be obtained, a more particular description of the invention briefly described above will be rendered by reference to specific example embodiments thereof which are illustrated in the appended drawings. Understanding that these drawings depict only typical, though preferred, embodiments of the invention and are not therefore to be considered to be limiting of its scope, the invention will be described and explained with additional specificity and detail through the use of the accompanying drawings.

BEST MODES FOR CARRYING OUT THE INVENTION

Figure 1:
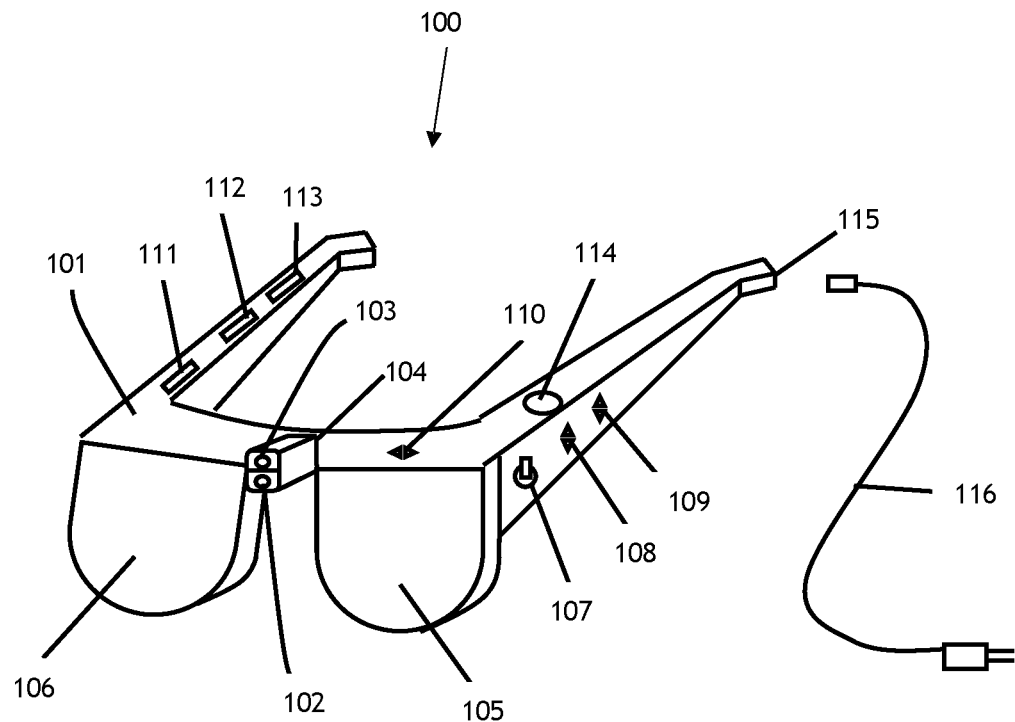
FIG. 1 depicts one embodiment of electronic loupe according to a first embodiment of the present invention.
Figure 1:
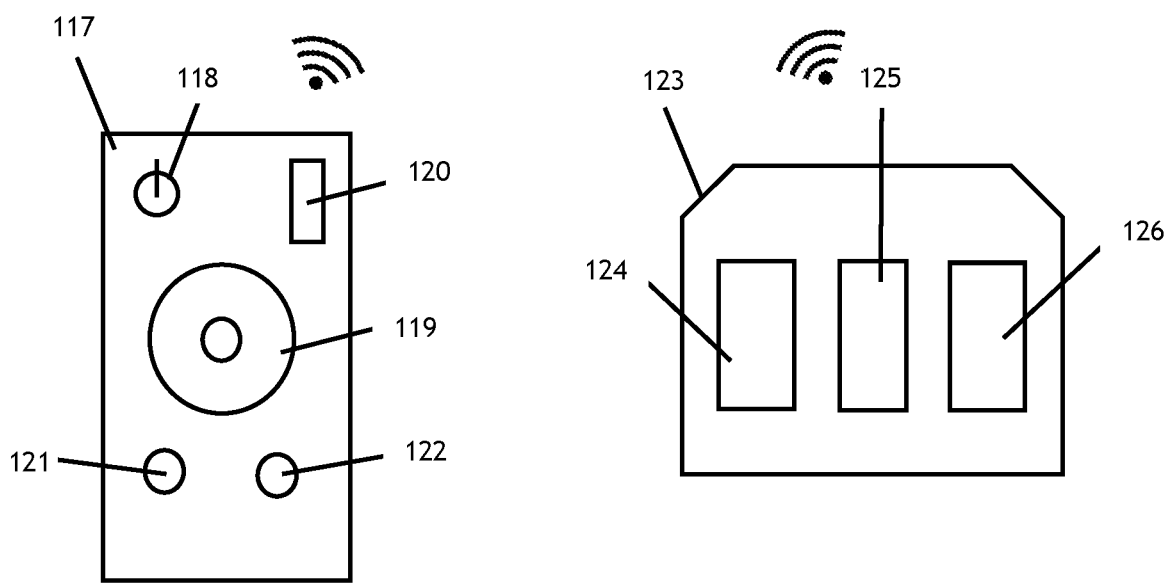

With reference now to the drawings, preferred embodiments of the electronic is herein described. It should be noted that the articles "a," "an," and "the," as used in this specification, include plural referents unless the content clearly dictates otherwise.

FIG. 1 depicts one embodiment of electronic loupe (100) with a frame (101). The frame (101) includes all the components that are needed for the loupe. A battery, electronic control circuit, view windows, wireless communication tool, storage media, and others which are not shown FIG. 1 are inside the arms of the frame (101). A video camera (102) may have an optional optical lens in front of camera. The video camera (102) and lens can be automatically zoomed and focused on observed objects. The video camera (102) can be CCD or CMOS or Micro LED or any other type of digital camera. Video camera (102) may also be a plurality of cameras. The resolution of video camera (102) shall be as high as possible based on available technologies. An LED light source (103) may be provided for illumination. The light color temperature from LED light source (103) may be ranged from 2700K to 9000K depending on the needs. The color rendering index (CRI) should be 80 or higher. Light source (103) shall generate a light spot that is of a size that the application needs. The camera (102) and LED light source (103) can be in one body or separate bodies. There may be a mounting structure (104) for video camera (102) and light (103) to be attached to the center position of the frame (101) as illustrated. However, the light (103) and camera (102) can be attached to any position of the frame (101). The mounting structure (104) can make the camera (102) and light (103) adjustable to desired directions in multiple directions. The camera (102) and light (103) can also be detached from the main frame (101) with extra wire connection so that camera (102) and light (103) can reach to a desired surface for closer look of said surface. Viewing windows (105), (106) are provided so the user may see either video or image. The view windows (105), (106) can be semi-transparent or transparent screens. Details of view windows will be described in a later section. The displays in the view windows (105), (106) are preferred to be as high resolution as technologically available. The display windows (105) and (106) may be hinged so that they may be selectively flipped up to give the user a normal view of surroundings. LED light source for illumination purpose to aid camera to catch clear images. Power switch (107) is provided to turn the unit on and off, while adjustment buttons (108), (109) control the intensity of the LED light source and contrast of the display. The camera can be used with or without the LED light. Magnification is controlled with another button or button set (110). The user may record what is viewed by activating a control button (111) while an inlet/outlet (112) for an external storage may also be provided. External viewing may be enabled by providing a port (113) to export the viewed event to external terminals for third party viewing using a cable. The video signal can also be exported through a wireless manner like Wi-Fi, Bluetooth, and others to another view screen or glasses. There will be a graphic user interface, such as one shown in FIG. 8, in the displays (105), (106) to guide user for control and status of the functions of the device. At least one navigation button (114) for navigating the graphic interface on the display is provided to control various functions of the device. Charging may be accomplished through a simple inlet (115) and power supply (116).

All the control functions can be displayed in the display windows (105), (106) in the user graphic interface and all the controls described above can also be achieved through a voice control technology to activate the function buttons as needed. User can simply say the commands to activate the desired function.

All the control functions can be displayed in the display window in the graphic interface and all the controls described above can also be achieved with a remote control. The remote control can be operated by hand or voice. A remote control (117) may also be provided. The remote control (117) transmits signal through wireless means to the main unit. There is a power button (118) to turn on and turn off the device. There is a navigation button (119) to go through the graphic interface for selection of the functions displayed in the view window. There is a zoom button (120) to select the desired magnification. There is a video recording button (121) to record the event. There is a picture taking button (122) to take picture of the object. There may be other buttons for quick action to be added to the remote as needed.

All the key controls may also be controlled by a wireless footswitch (123) for easy operation if the operator's hands are occupied during the use. Switch (124) is for recording the event. Switch (125) is for zooming in and out for desired magnification. Switch (126) for taking pictures. There may be other switches for quick action to be added to the main body of the switch.

Figure 2:
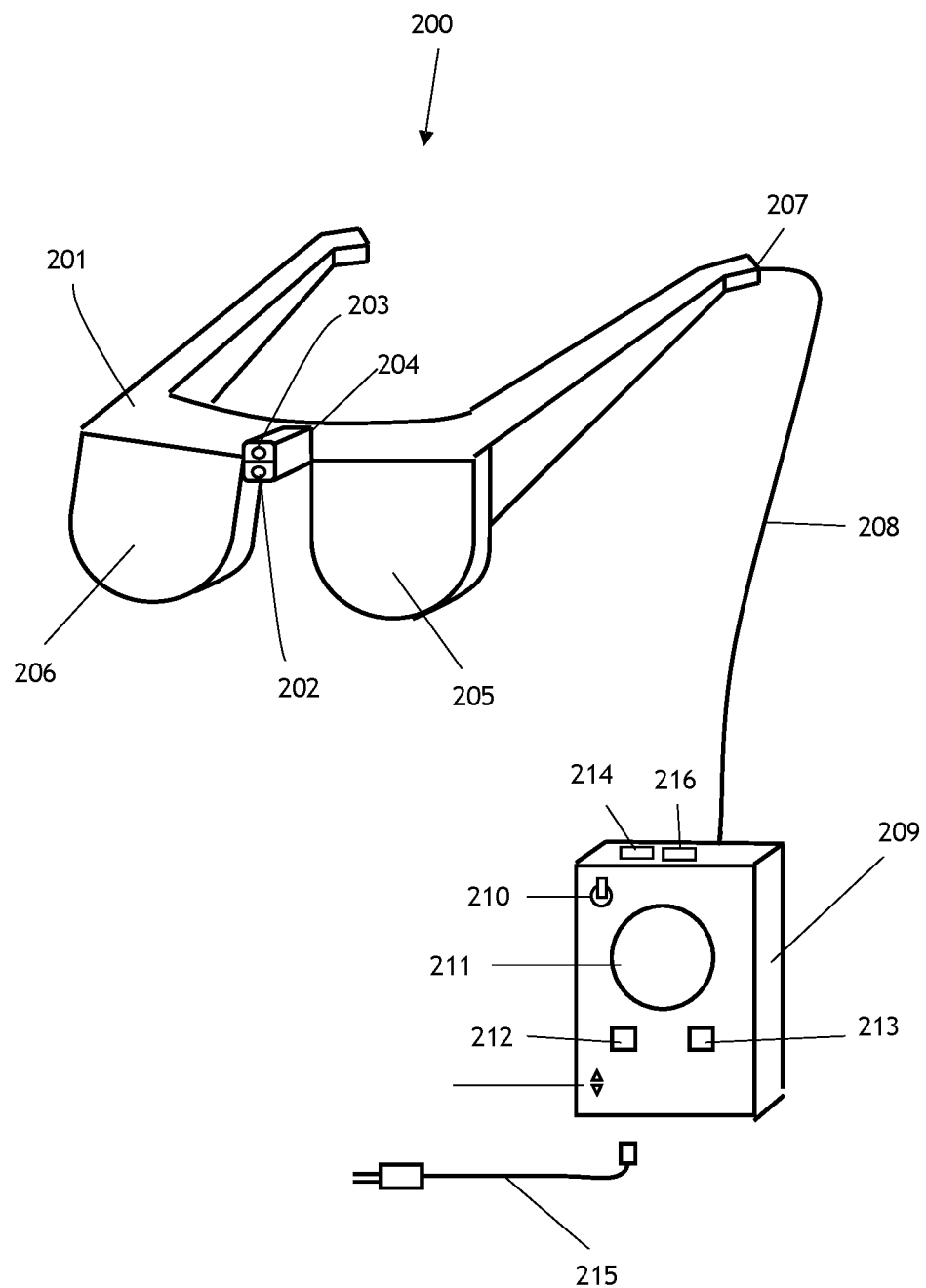
FIG. 2 depicts another embodiment of electronic loupe according to a second embodiment of the present invention.

FIG. 2 depicts another embodiment of electronic loupe (200) with wired control and power supply. Like in the first embodiment, the frame (201) includes all the components that are needed for the loupe (200). Video camera (202) and LED light source (203) for illumination of the object are provided for a clear image. Video camera (202) and light (203) can be in one body or separate body depending on the requirements. The light color temperature may be ranged from 2700K to 9000K depending on the needs. The color rendering index (CRI) should be 80 or higher. The camera (202) can be used with or without LED light (203). Fixture (204) is used to attach video camera (202) and light (203) to frame (201). The mounting structure (204) can make the camera (202) and light (203) adjustable to desired directions. The camera (202) and light (203) can also be detached from main frame with extra wire connection so that camera and light can reach to desired surface for close look of the surface. Viewing windows (205) and (206) are for video and image. Details of view windows (205) and (206) will be described in a later section. The displays are preferred to have high resolution. A control box (209) is connected by a cable (208) into port (207), connecting frame of the loupe to control box (209). Control box (209) contains a rechargeable battery and electronic control circuits which are not displayed in the figure. Power is activated by power switch (210). A navigation button (211) to reach different commands in the display in the goggle is provided. Such a button may be a simple rotate-and-press type or any other type now known or later discovered that will allow navigation of the graphical user interface. Control buttons (212), (213) are provided to work with navigation button for control and for recording. An external storage disk inlet (214) is also provided. Power supply (215) is set to connect to control box (208) to charge the battery. The video signal can be exported through a connection port (216) or wireless manner like Bluetooth to another view screen or glasses. This embodiment will make the main frame light in weight. The features of the components in this embodiment shall be the same as these described in FIG. 1. This embodiment can also be controlled by voice, remote control, and wireless footswitch as described in FIG. 1.

Figure 3:
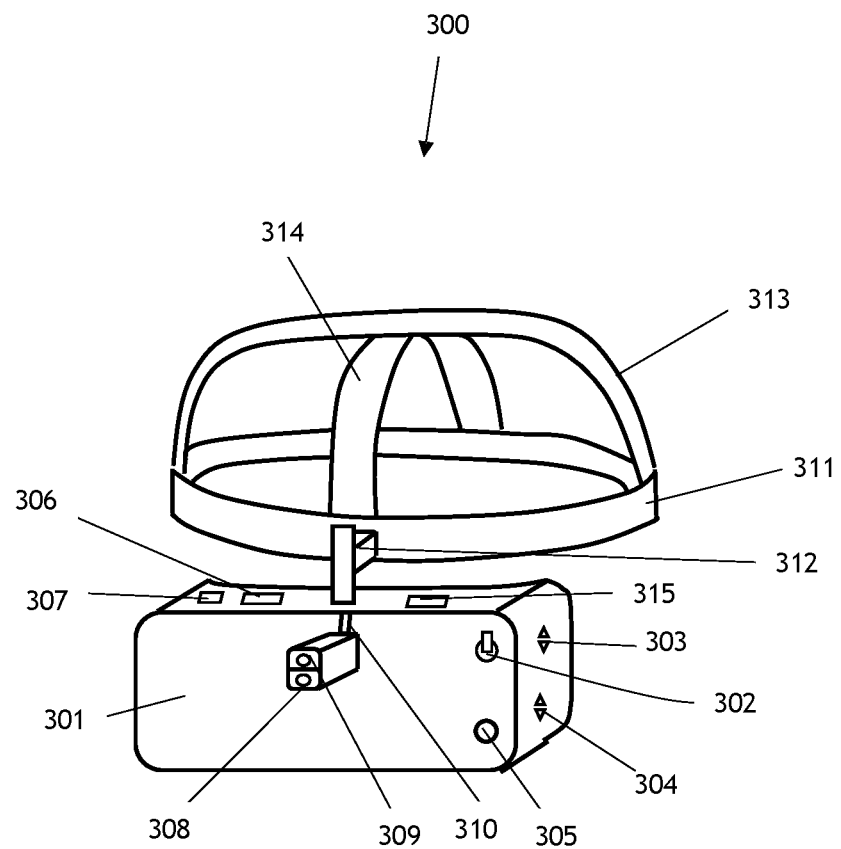
FIG. 3 depicts another embodiment of electronic loupe according to a third embodiment of the present invention.

FIG. 3 depicts another wireless embodiment of invented electronic loupe (300). A view piece (301) contains electronic control, optics, display, battery, storage disk, export port, and others inside the body (301). On the view piece box (301), there is a main power switch (302). A light intensity adjustment (303) and an image contrast and brightness adjustment (304) are also provided. A recording or picture taking button (305) may also be provided. A slot for external storage disk (306) and a charging input (307) may also be provided. A video camera (308) and an LED light source (309) can be in one body or separate bodies depending on needs. The camera (308) and light (309) are attached to view piece (301) using structure (310). The structure (310) can adjust camera and light to any desired direction. The camera (308) and light (309) can also be detached from the view piece with extended wire for a close up look of designed object. The camera can be used with or without LED light. The view piece (301) is attached to head band (311) using adjustment structure (312). The adjustment structure (312) can adjust the view piece horizontally and vertically to make the view piece to fit human face anatomy to have a clear view of images. The adjustment structure (312) can also flip the view piece to from eyes to see normal physical space. The head band can have a cross bands (313) and (314) to secure overall head band to user's head tightly and stably. The video signal can be exported through a connection port (315) or wireless manner like Bluetooth to another view screen or glasses. This embodiment will make the wearing of the device better positioned and hold on to the user's head. The features of the components in this embodiment shall be the same as these described in FIG. 1. This embodiment can also be controlled by voice, remote control, and wireless footswitch as described in FIG. 1.

Figure 4:
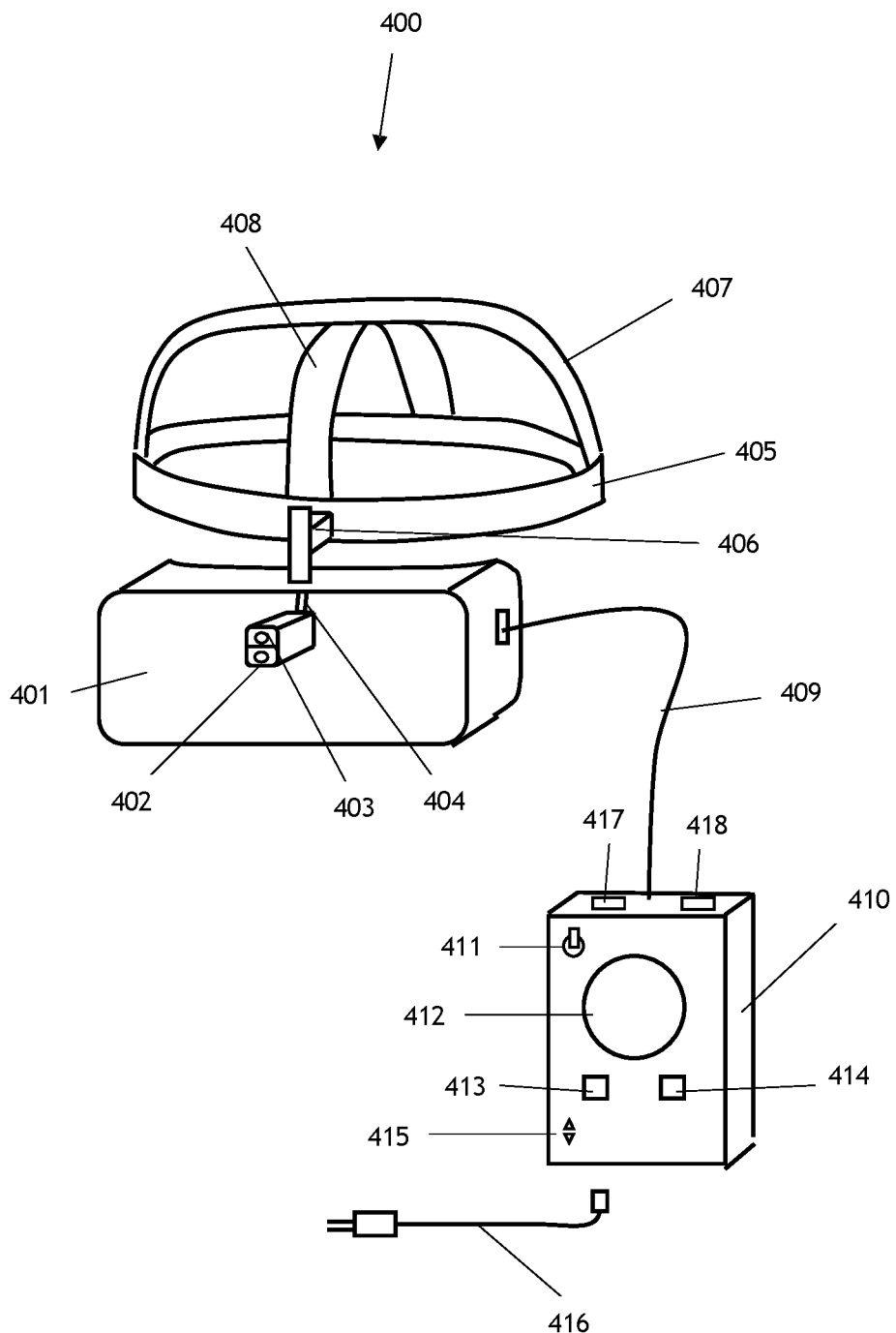
FIG. 4 depicts another embodiment of electronic loupe according to a fourth embodiment of the present invention.

FIG. 4 depicts another wired embodiment of invented electronic loupe (400). Like the previous embodiment (401) is a view piece which contains electronic control, optics, display, and others inside the body). A video camera (402) and an LED light source (403) are attached to a view piece using structure (404). The camera (402) and LED light source (403) can be in one body or separate bodies depending on needs. The structure (404) can adjust camera (403), (404) to any desired direction. The camera (403) and light (404) can also be detached from view piece with extended wire for a close-up look of designed object. The camera (403) can be used with or without LED light (404). The view piece (401) is attached to a head band (405) using adjustment structure (406). The adjustment structure (406) can adjust the view piece horizontally and vertically to make the view piece fit human face anatomy to have a clear view of images. The adjustment structure (406) can also flip the view piece to from eyes to see normal physical space. The hand band can have a cross bands (407) and (408) to secure overall head band to the head tightly. The head band can be adjusted to fit different sizes of head. A cable (409) connects view piece (401) with a control box (410), containing a rechargeable battery and electronic control circuits which are not displayed in the figure. Power switch (411) to turn the unit on and off is also provided. Like in the previous embodiment, (412) is a navigation button to reach to different commands in the display in the goggle while (413) is a control button to work with navigation button for control. Recording control (414) and an inlet for an external storage disk (415) are also provided. Cord (416) is a charging power supply set to connect to control box (410) to charging battery through port (417). The video signal can be exported through a connection port (418) or wireless manner like Bluetooth to another view screen or glasses. This embodiment will make the wear of device better positioned and hold in user's head with lighter weight. The features of the components in this embodiment shall be the same as these described in FIG. 1. This embodiment can also be controlled by voice, remote control, and wireless footswitch as described in FIG. 1. For embodiments described in FIGS. 3 and 4, the battery and other components can also be positioned on opposite side of head band to balance the overall weight of the unit.

Figure 5:
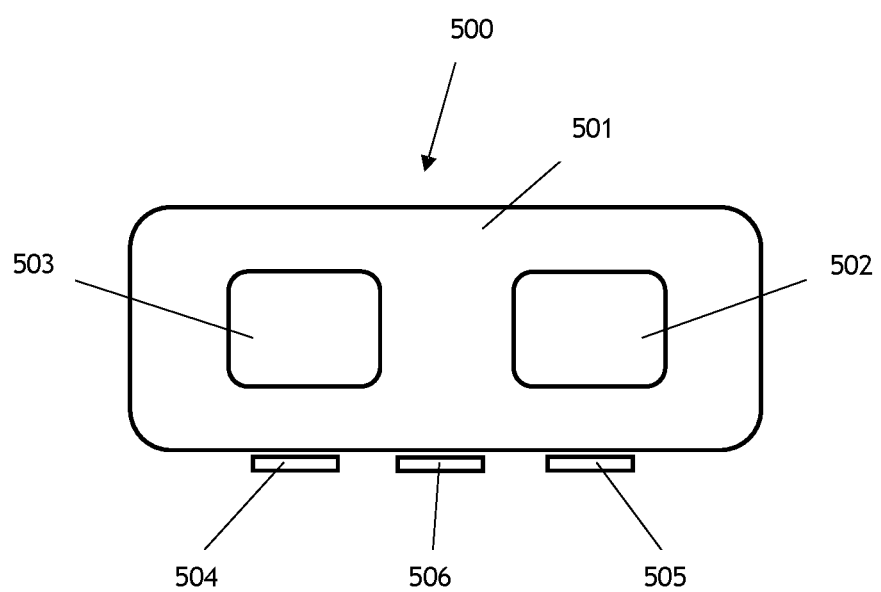
FIG. 5 depicts the eye view adjustment of an electronic loupe according to an embodiment of the present invention.

FIG. 5 depicts eye view adjustment (500) of a view piece, similar to that shown in FIGS. 3 and 4. As can be seen in the profile of the view piece on eyes' side, (501) is the view piece while (502) and (503) are the view windows for eyes, respectively. The view windows can be adjusted for pupil distance and focus distance for eye vision. Buttons (504), (505) are provided to adjust the left view window and right view window. Focus of eyes to the display may be adjusted through button (506). The user can adjust view windows to fit different person's eye requirements for viewing objects. The image quality can be adjusted through different control buttons in either view piece or control box.

Figure 6:
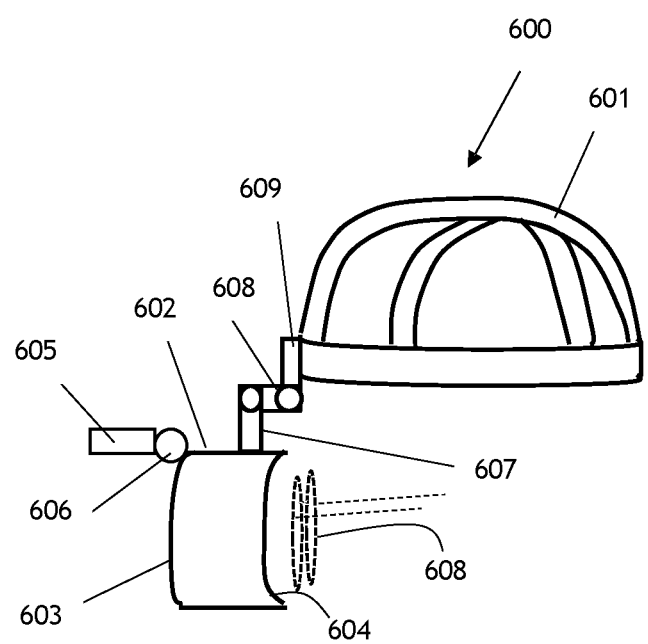
FIG. 6 depicts a side view of an electronic loupe, as shown in FIG. 4 or 5.

FIG. 6 depicts the side view of one embodiment of electronic loupe (600). Head band (601) is adjustable to fit to a human head while (602) is a view piece with a front side (603) and back side (604). Back side (604) faces the human face and is aligned with eyes. A view piece (602) also contains a video camera and light (605), attached by structure (606). The structure (606) can be adjusted in different directions to position the camera and light (605) as desired. A leveler (607) may attach to view piece (602) in one end and subsequently attached to a second leveler (608) by its other end. The attachment between (607) and (608) shall have the following mechanical functions: being able to swing eye view piece (602) at least 90 degrees from eye level; and move the eye piece back and forth in relative to horizontal level of leveler piece (608). Leveler (608) may be attached to a third leveler (609). Leveler (608) should move up and down along third leveler (609). Such a mechanism will be enabled to level the loupe (600) with the human eye and, optionally, accommodate the use of prescription eyeglasses (608).

Figure 7:
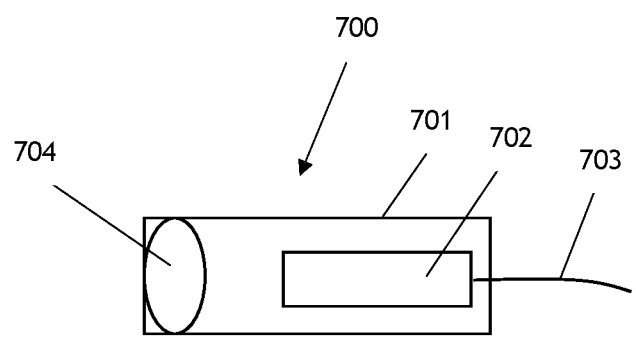
FIG. 7 depicts a camera setup according to an embodiment of the present invention.

FIG. 7 depicts camera setup (700). Housing (701) contains a video camera (702) while (703) is the electrical cable to provide power and receive signals from the video camera. Camera (702) is behind a lens system (704) for enabling camera (702) to focus for a variable working distance, and for magnification. The magnification of the lens can be 2x or higher. The preferred choice is the lens can be changed from 1x to different magnification. This setup will help with the magnification of the initial image. The image then can be magnified using digital software to enlarge for desired magnification without losing resolution.

Figure 8:
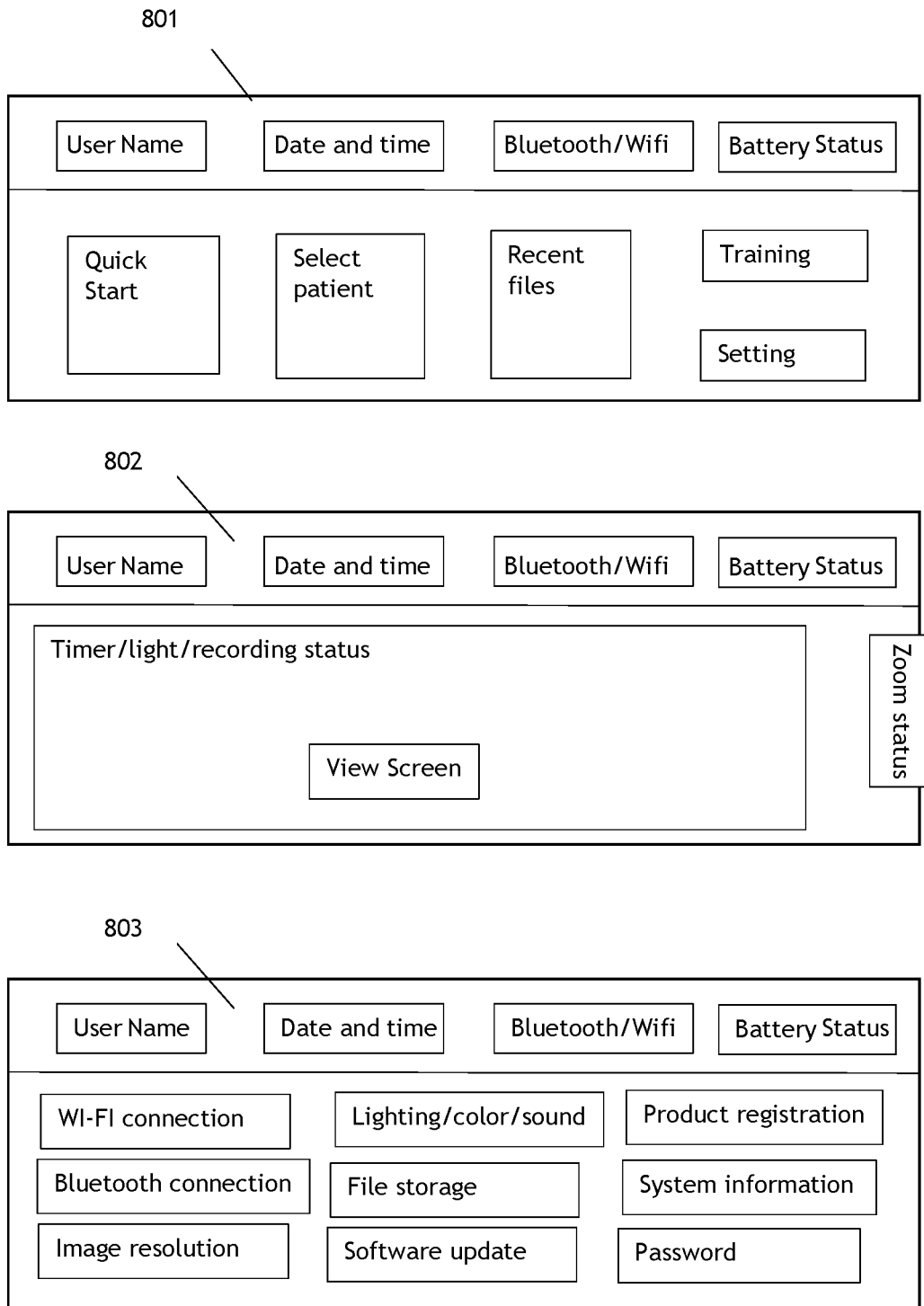
FIG. 8 depicts a basic layout for a graphic user interface.

FIG. 8 illustrates a basic graphic user interface for the device. Interface (801) is what the user will see when the unit starts. The top bar will have indicators for username, date and time, blue tooth or wi-fi connection status, and battery status. There are several buttons for user to select including setting, training, quick start, selecting patient records, and recent files. Interface (802) is when the unit is in operation to observe the subject. The interface (802) includes the top view bar, a view screen with indication timer, lighting status, and recording status. A side bar may indicate the zoom status. Interface (803) is for setting of the unit including wi-fi or blue tooth connection, image resolution, lighting/color/sound control, file storage software update, production registration, system information and password setting. Interfaces (801), (802), and (803) are just basic settings for user interface and can be added any desired function control buttons as user desires.

The method for use is as follows. The user wears the loupe on head, turns on the power, positions the digital cameras to designed position, turns on the LED light source as needed for illumination, adjusts the contrast of the display, adjusts magnification as needed, and records the event as needed. User can use voice control, remote control, or wireless footswitch control to control functions of the device. The recorded event can be stored in the disk inside the frame or an external storage disk or in the cloud storage or external terminal for broadcasting. The observed event can be displayed through other display devices for third party review via wi-fi, blue tooth, or wired connection.

The display can show necessary information about the loupe. Information can be displayed, not limited to, followings: magnification, battery status, dates, and recording status.

The magnification of image in the electronic loupe will be the combination of the optical lens and the provided digital zoom technology. There are many advanced zoom technologies available in the market. High density CCD or CMOS to create an image with 20 megapixels is readily available. Using these imaging devices, a magnification of 10× or higher can be achieved digitally with quality. It is preferred to have CCD or CMOS sensors to create image with as high-resolution density as possible, at least 5 megapixels. The electronics and software to achieve digital zoom will be developed based on current, and future, available technology.

The view display can be LCD, OLED, micro-LED, or any type of display. The resolution on the display should be above 680×480 pixels. Higher resolution preferred.

Although the present invention has been described with reference to preferred embodiments, numerous modifications and variations can be made and still the result will come within the scope of the invention. No limitation with respect to the specific embodiments disclosed herein is intended or should be inferred. The term "headpiece" as used in the claims shall include both the frames of the first two embodiments and the headbands of the other disclosed embodiments.

INDUSTRIAL APPLICABILITY

The present invention has industrial applicability in that it may be produced by industry and has usefulness in the medical, dental, optical, and other fields.

What is claimed is:

1. An electronic loupe comprising:
   at least one digital camera system with magnification capability;
   a light source for illumination of a targeted area of said digital camera system;
   a recording system for documentation of the target area on command, said documentation including data provided regarding the target area and imagery of the target area;
   a viewing structure mounted upon a linkage which is likewise attached to a headpiece, positioning the viewing structure in a manner for observing upon which the imagery is displayed;
   the linkage further comprising:
      a first leveler attached between the viewing structure and a second leveler;
      the second leveler being attached to a third leveler, and slidable vertically along a length thereof; and,
      the first leveler hinged and slidable forward and rearward along a length of the second leveler as defined by a connection between the second and third levelers;
      wherein the third leveler is also operatively coupled to a head piece and the first leveler is in hinged connection to the viewing structure and allows for a 90-degree rotation of the viewing structure from eye level.

2. The electronic loupe of claim 1, the recording system further comprising an internal storage device resident within a structure of the electronic loupe.

3. The electronic loupe of claim 1, the recording system further comprising an external storage device resident outside within a structure of the electronic loupe.

4. The electronic loupe of claim 1, the recording system further comprising cloud storage.

5. The electronic loupe of claim 1, further comprising an export system whereby images may be exported to a display outside of the electronic loupe.

6. The electronic loupe of claim 1, further comprising wireless communication technology.

7. The electronic loupe of claim 1, the recording system being accessible by a system independent of the electronic loupe.

8. The electronic loupe of claim 1, further comprising an adjustment structure operationally linked to at least one component of the digital camera system and light source said adjustment structure controlling a distance between a main body of the electronic loupe and the digital camera.

9. The electronic loupe of claim 1, the digital camera system and light source being adjustable to accommodate distances selected from a set of distances consisting of: pupillary distance and focus distance.

10. The electronic loupe of claim 1, the viewing structure being adjustable to accommodate eyeglasses.

* * * * *